US009131526B2

(12) United States Patent
Comeau et al.

(10) Patent No.: US 9,131,526 B2
(45) Date of Patent: *Sep. 8, 2015

(54) POOLED TRANSPORT AND CONTROL FUNCTIONS IN A 3GPP LTE NETWORK

(75) Inventors: Adrien Comeau, Ottawa (CA); David Donald, Ottawa (CA); Larry Murat, Kanata (CA); Christopher Richards, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 417 days.

This patent is subject to a terminal disclaimer.

(21) Appl. No.: 13/484,903

(22) Filed: May 31, 2012

(65) Prior Publication Data

US 2013/0322346 A1 Dec. 5, 2013

(51) Int. Cl.
*H04W 80/04* (2009.01)
*H04W 12/00* (2009.01)
*H04W 80/02* (2009.01)
*H04W 88/08* (2009.01)

(52) U.S. Cl.
CPC .............. *H04W 80/02* (2013.01); *H04W 88/08* (2013.01); *H04W 88/085* (2013.01)

(58) Field of Classification Search
USPC ......... 370/252, 254, 328, 331, 332, 333, 334; 455/432.1, 435.1, 437, 439, 442, 436
See application file for complete search history.

(56) References Cited

U.S. PATENT DOCUMENTS

| 2008/0095175 | A1* | 4/2008 | Grandhi et al. ........... 370/395.52 |
| 2009/0303914 | A1* | 12/2009 | Gonsa et al. .................. 370/312 |
| 2010/0075667 | A1* | 3/2010 | Nakamata et al. ......... 455/432.3 |
| 2010/0080186 | A1 | 4/2010 | Guo et al. |
| 2010/0296453 | A1* | 11/2010 | Grahn et al. ................... 370/328 |
| 2011/0117919 | A1* | 5/2011 | Lee et al. ...................... 455/436 |
| 2011/0223900 | A1 | 9/2011 | Yu et al. |
| 2012/0039299 | A1 | 2/2012 | Teyeb et al. |
| 2013/0269001 | A1* | 10/2013 | Janakiraman et al. ............ 726/4 |

FOREIGN PATENT DOCUMENTS

| EP | 2 367 397 A1 | 9/2011 |
| WO | 2010125982 A1 | 11/2010 |
| WO | 2012016593 A1 | 2/2012 |

OTHER PUBLICATIONS

International Search Report and Written Opinion dated Jan. 7, 2014 for International Application No. PCT/IB2013/053672, International Filing Date May 7, 2013, consisting of 15 pages.
International Search Report and Written Opinino dated Jan. 2, 2014 for International Application No. PCT/IB2013/054448, International Filing Date May 29, 2013 consisting of 16 pages.

(Continued)

*Primary Examiner* — Awet Haile
(74) *Attorney, Agent, or Firm* — Christopher & Weisberg, P.A.

(57) ABSTRACT

Presented are methods and apparatus for decoupling transport and control (T&C) functions from a plurality of eNBs and collecting the T&C functions in a centralized entity for managing the T&C functions for a larger pool of eNBs. An enhanced interface and protocol is defined for allowing the new T&C pool entity to communicate with the eNBs over a shared IP based network. The redistributed functionality provides for optimizing both data compression capabilities and security by compressing data earlier in its transmission path and by encrypting data before it is sent to an eNB.

16 Claims, 15 Drawing Sheets

(56) References Cited

OTHER PUBLICATIONS

PCT Invitation to Pay Additional Fees, Form PCT/ISA/206, for corresponding International Application No: PCT/IB2013/053672; International Filing Date: May 7, 2013 consisting of 5-pages.

PCT Invitation to Pay Additional Fees, Form PCT/ISA/206, for International Application No: PCT/IB2013/054448; International Filing Date: May 29, 2013 consisting of 6-pages.

J. Stone, et al.; "Stream Control Transmission Protocol (SCTP) Checksum Change"; Network Working Group, Request for Comments: 3309, Updates 2960, Category: Standards; The Internet Society; pp. 1-17; Sep. 2002.

Information Sciences Institute; "Internet Protocol, Darpa Internet Program, Protocol Specification"; RFC 791; pp. 1-50; Sep. 1981; Arlington, VA.

3GPP LTE; 3rd Generation Partnership Project; Technical Specification Group Services and System Aspects; General Packet Radio Service (GPRS) enhancements for Evolved Universal Terrestrial Radio Access Network (E-UTRAN) access (Release 11); 3GPP TS 23.401 V11.2.0; pp. 1-285; Jun. 2012; Valbonne, France.

3GPP LTE; "3rd Generation Partnership Project; Technical Specification Group Core Network and Terminals; General Packet Radio System (GPRS) Tunnelling Protocol, User Plane (GTPv1-U) (Release 11)"; 3GPP TS 29.281 V11.3.0; pp. 1-26; Jun. 2012; Valbonne, France.

3GPP LTE; "3rd Generation Partnership Project; Technical Specification Group Core Network and Terminals; General Packet Radio Service (GPRS) GPRS Tunnelling Protocol (GTP) across the Gn and Gp interface (Release 11)"; 3 GPP TS 29.060 V11.3.0; pp. 1-174; Jun. 2012; Valbonne, France.

3GPP LTE; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; 3GPP TS 36.300 V11.2.0; pp. 1-201; Jun. 2012; Valbonne, France.

3GPP LTE; "3rd Generation Partnership Project; Technical Specification Group Radio Access Network; Evolved Universal Terrestrial Radio Access (E-UTRA); Packet Data Convergence Protocol (PDCP) specification (Release 10)"; 3GPP TS 36.323 V10.1.0; pp. 1-26; Mar. 2011; Valbonne, France.

3GPP LTE; "3rd Generation Partnership Project; Technical Specification Group Radio Access Network; Evolved Universal Terrestrial Radio Access (E-UTRA); Radio Resource Control (RRC) Protocol specification (Release 11)"; 3GPP TS 36.331 V11.0.0; pp. 1-302; Jun. 2012; Valbonne, France.

3GPP LTE; "3rd Generation Partnership Project; Technical Specification Group Radio Access Network; Evolved Universal Terrestrial Radio Access Network (E-UTRAN); S1 signalling transport (Release 10)"; 3GPP TS 36.412 V10.1.0; pp. 1-8; Jun. 2011; Valbonne, France.

3GPP LTE; "3rd Generation Partnership Project; Technical Specification Group Radio Access Network; Evolved Universal Terrestrial Radio Access Network (E-UTRAN); S1 Application Protocol (S1AP) (Release 11)"; 3GPP TS 36.413 V11.0.0; pp. 1-258; Jun. 2012; Valbonne, France.

3GPP LTE; "3rd Generation Partnership Project; Technical Specification Group Radio Access Network; Evolved Universal Terrestrial Radio Access Network (E-UTRAN); S1 data transport (Release 10)"; 3 GPP TS 36.414 V10.1.0; pp. 1-8; Jun. 2011; Valbonne, France.

Y. Shi, et al., "CAPWAP Protocol Binding MIB for IEEE 802.11 draft-ietf-capwap-802dot11-mib-06"; Internet Engineering Task Force; Internet-Draft; Intended status: Informational; Expires: Jul. 6, 2010; pp. 1-24; Jan. 2, 2010 Retrieved from the Internet: URL < http://tools.ietf.org/id/draft-ietf-capwap-802dot11-mib-06.txt.

Written Opinion of the International Preliminary Examining Authority dated Jul. 21, 2014 for International Application No. PCT/IB2013/053672, International Filing Date May 7, 2013 consisting of 8-pages.

Written Opinion of the International Preliminary Examining Authority dated Aug. 25, 2014 for International Application No. PCT/IB2013/054448; International Filing Date: May 29, 2013 consisting of 10-pages.

\* cited by examiner

POOLED TRANSPORT AND CONTROL FUNCTIONS IN A 3GPP LTE NETWORK

TECHNICAL FIELD

The present invention relates generally to telecommunications systems, and in particular, to methods, systems, devices and software for decoupling Packet Data Convergence Protocol (PDCP) and Radio Link Control (RLC) protocol functions from an eNode-B entity.

BACKGROUND

Existing Third Generation Partnership Program (3GPP) universal terrestrial radio access networks (UTRAN) 100, such as a wideband code division multiple access (WCDMA) network or a universal mobile telecommunications system (UMTS) network, depicted in prior art FIG. 1, split the UTRAN 102 into two entities. The first entity is a Radio Network Controller (RNC) 104 and the second entity is a node-B 106. The RNC 104 controls the node-B 106 devices to which it is connected by providing radio resource management and a portion of the mobility management functions. The RNC 104 also provides data encryption/decryption services to protect the user data from being compromised while in transit to and from the user equipment (UE) 108. The node-B 106 provides the transmitter and the receiver for communicating with the UEs 108 within the defined area of the cell. In order to facilitate the handover of a UE 108 from one node-B 106 to another node-B 106 under the control of a different RNC 104, as the UE 108 changes geographical location, the RNCs 104 must communicate with both the core network 110 and the neighboring RNCs 106.

In contrast to the 3GPP UTRAN 100 of FIG. 1, the Long Term Evolution (LTE) based evolved universal terrestrial radio access networks (EUTRAN) 100 architecture, depicted in prior art FIG. 2, has removed the RNC 104 from the LTE network. The functionality of the RNC 104 has been distributed to both core network elements, such as the Mobility Management Entity (MME) 202, and the evolved node-B (eNB) 204. In a complicating factor, the introduction of a portion of the RNC 106 functionality into the eNB 204 has resulted in the requirement for new inter-eNB interfaces 206 and complex hand-off signaling protocols for exchanging information between eNBs 204 as the UE 108 moves around a cell and transitions from one eNB 204 to another.

Further, the traditional LTE radio access network (RAN) is comprised of distributed eNBs 204 connected to MMEs 202/ serving gateways (S-GW) entities via the S1 interface 208 with the eNBs 204 connected to each other with the X2 interface 206. The LTE eNB 204 hosts functions to support Transport and Control (T&C) capabilities such as Radio Resource Management (RRM) (i.e., radio bearer control, radio admission control, connection mobility control and dynamic allocation of resources to UEs 108 in both uplink and downlink), Internet Protocol (IP) header compression and encryption of user data stream, selection of MME 202 at UE 108 attachment when no routing to an MME 202 can be determined from the information provided by the UE 108, routing of user plane data toward the S-GW 202, scheduling and transmission of paging messages originating from the MME 202, scheduling and transmission of broadcast information originated from the MME 202 or Operations and Maintenance (O&M) and measurement and measurement reporting configuration for mobility and scheduling.

As depicted in prior art FIG. 3 of existing 3GPP eNB 302 functions 300, the eNB 302 embodies the T&C functions required by an LTE network such that a common shared UTRAN 102 RNC 104 is not required. Specifically, the eNB 302 includes Radio Resource Control (RRC) 304 functions for managing mobility and radio resources for the UEs 108 in the eNBs 302 cell coverage area and Packet Data Coverage Protocol (PDCP) 306 functions to provide L3 services to the lower layers for user and control plane messages. Examples of the L3 services are in-sequence delivery of data including duplicate detection and elimination, user plane IP header compression and ciphering of user and control plane data and integrity protection of user and control plane data. Each eNB 302 traditionally supports a small number of cells that cover a tightly coupled geographical area. The cell count per eNB 302 is usually limited, e.g., three cells per eNB 302 and the RRC 304 and PDCP 306 functions embedded in the eNB 302 are limited to supporting the cells controlled by the eNB 302 and the UE 108 associated with those cells.

Problems associated with the previously described architectures are magnified by the projected growth in the use of these services. Wireless broadband traffic is projected to more than double every year for the foreseeable future. Keeping pace with this growth will require a proportional increase in the number of cells in any given geographical area. With the introduction of LTE advanced features to support heterogeneous networks and the requirement for a larger number of cells, the number of cells in a given geographical area is expected to increase over one hundred times with the number of inter-cell mobility events increasing proportionally.

Another emerging problem associated with an eNB 302 providing mobility management functions is the evolutionary trend of network deployments which include Multiple Radio Access Technology (Multi-RAT), i.e., mobility between different radio access technologies such as WCDMA, WiFi and CDMA. The issue arises because the LTE eNB 302 architecture includes mobility management functions. As a result, part of the mobility coordination is distributed at the eNB 302 level requiring the eNB 302 to be aware of each of the hardware technologies.

Another issue related to problems with the existing architecture associated with increasing cell density is the number of user context (e.g., security keys, Robust Header Compression (ROHC), RRC 304 and session state) transfers between eNBs 302 increase as the number of mobility events increases. The successful and time sensitive of this data is critical for maintaining user sessions while the UE 108 is from one eNB 302 coverage area to another. Failure to meet the transfer requirements results in dropped calls or sessions. However, meeting this requirement is complex and error prone and engineering a RAN to provide the necessary high levels of mobility performance requires a relatively static network and significant operational overhead. LTE networks, however, are now in a growth portion of their lifecycle so consequently, maintaining mobility performance in networks that are inherently non-static will be problematic and expensive for network operators. Further, MME/S-GW nodes 202 are currently architected to handle a relatively limited number of S1 interfaces. Consequently, these nodes will struggle to perform efficiently with one hundred times the number of eNBs 302 deployed.

As depicted in prior art FIG. 4, the interface 410 between the PDCP 406 and the RLC 408 is defined as an internal software interface associated with an eNB 402. Accordingly, there is no protocol or transport specified for this interface, i.e., there is no way to distribute the RRC 404 and the PDCP 406 functions outside of the eNB 402. It should be noted in the depicted prior art eNB 402 that the interfaces between the functions are not defined by the 3GPP specifications and no mechanism exists allowing the functions to be located in physically separate network elements.

Market pressure is building for a solution that performs efficiently under the previously described conditions allowing better network performance with lower operating costs and a greater reliability compared to previously described solutions.

ABBREVIATIONS/ACRONYMS

3GPP Third Generation Partnership Program
   CDMA Code Division Multiple Access
   DRB Data Radio Bearer
   EUTRAN Evolved Universal Terrestrial Radio Access Network
   GPRS General Packet Radio Service
   GTP GPRS Tunnelling Protocol
   IRNA Internet Assigned Numbers Authority
   IP Internet Protocol
   LTE Long Term Evolution
   MAC Medium Access Layer
   MME Mobility Management Entity
   Multi-RAT Multiple Radio Access Technology
   O&M Operation and Maintenance
   PDCP Packet Data Convergence Protocol
   PDU Protocol Data Unit
   PHY Physical Layer
   RAN Radio Access Network
   RBS Radio Base Station
   RLC Radio Link Control
   RNC Radio Network Controller
   ROHC Robust Header Compression
   RRC Radio Resource Control
   RRM Radio Resource Management
   SCTP Stream Control Transmission Protocol
   S-GW Serving Gateway
   SRB Signal Radio Bearer
   T&C Transport and Control Functions
   TEID Tunnel Endpoint Identifier
   UDP User Datagram Protocol
   UE User Equipment
   UMTS Universal Mobile Telecommunications System
   UTRAN Universal Terrestrial Radio Access Network
   WCDMA Wideband Code Division Multiple Access
   WiFi Trademark for Wireless IEEE 802.11 Standards

SUMMARY

According to one exemplary embodiment, a server for managing transport functions for a plurality of eNodeBs (eNBs) over a shared network comprises: a processor configured to execute computer instructions and a memory configured to store said computer instructions wherein said computer instructions further comprise: a Packet Data Convergence Protocol (PDCP) component configured to manage the transport functions for the plurality of eNBs in a manner which is decoupled from said plurality of eNBs; and a signaling protocol component configured to transmit transport packets between said server and said plurality of eNBs over said shared network.

According to another exemplary embodiment, a method, stored in a memory and executing on a processor, for centralizing transport and control (T&C) functions for management of a plurality of enhanced eNodeBs (eNBs) and their associated cells comprising: disposing said T&C functions associated with each of said plurality of eNBs at one or more T&C pool entities; coordinating mobility events associated with said plurality of eNBs between said one or more T&C pool entities using an interface; and transmitting control signaling and data packets between said plurality of eNBs and said one or more T&C pool entities using a protocol across a shared network associated with said control signaling and data packets.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 1:
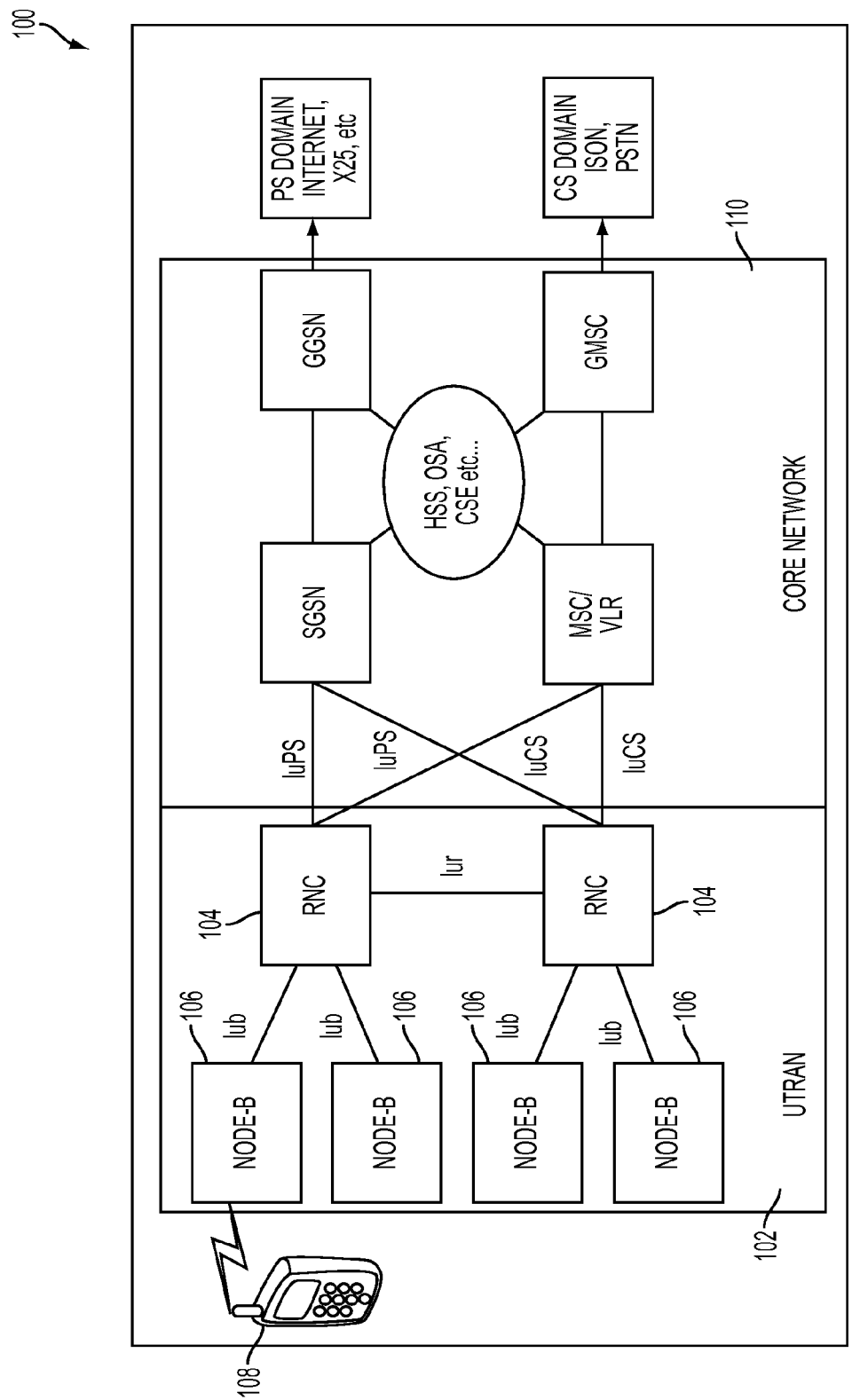
FIG. 1 depicts a prior art UMTS network architecture.
Figure 2:
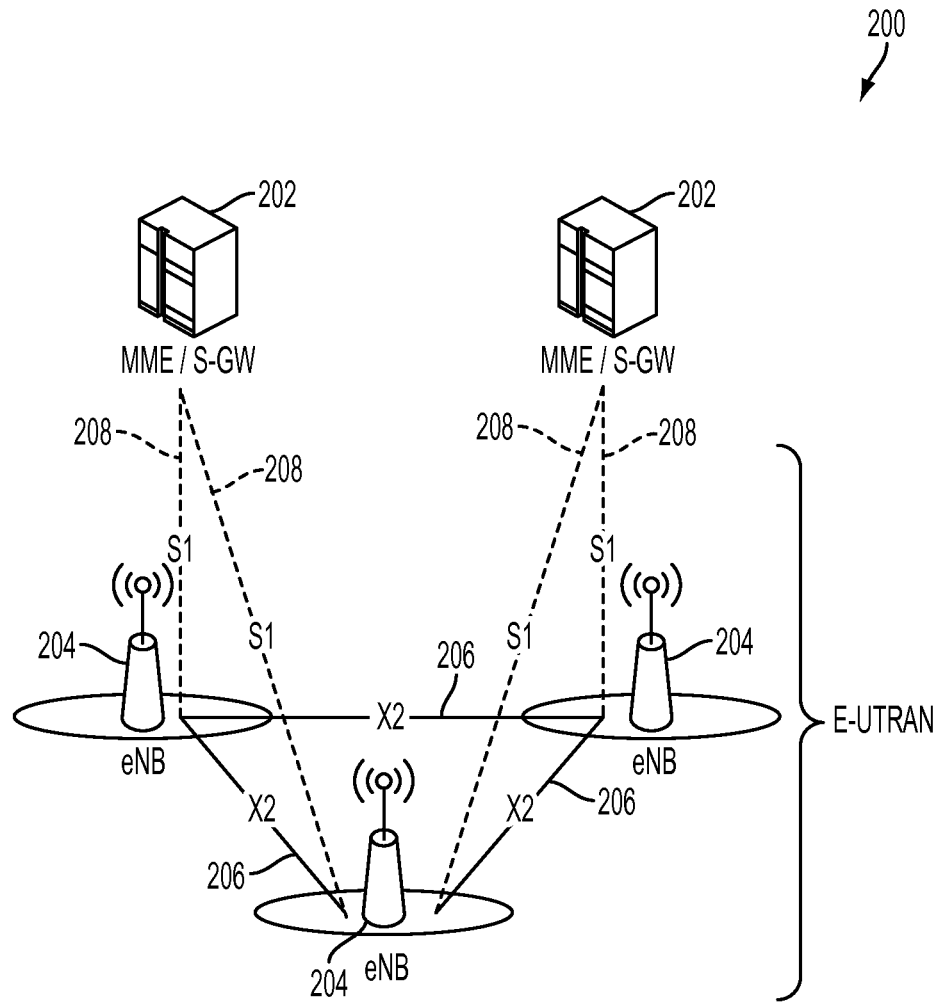
FIG. 2 depicts a prior art E-UTRAN.
Figure 3:
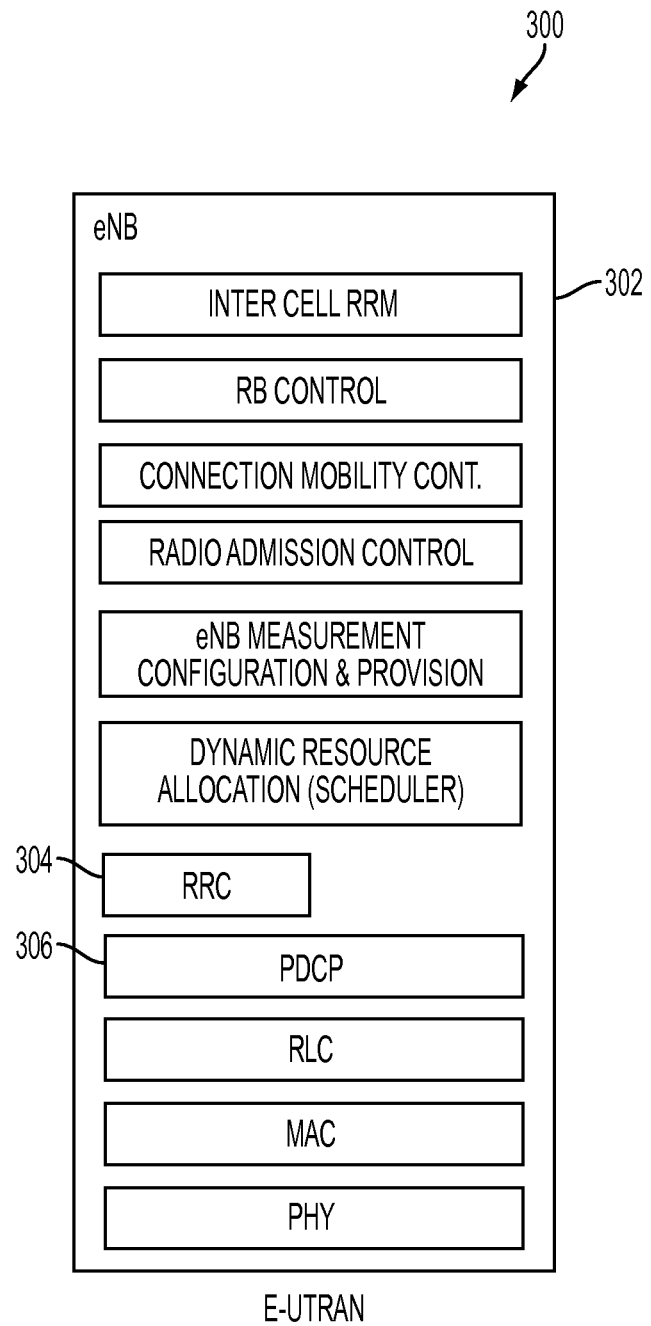
FIG. 3 depicts a prior art 3GPP eNB and its associated functions.
Figure 4:
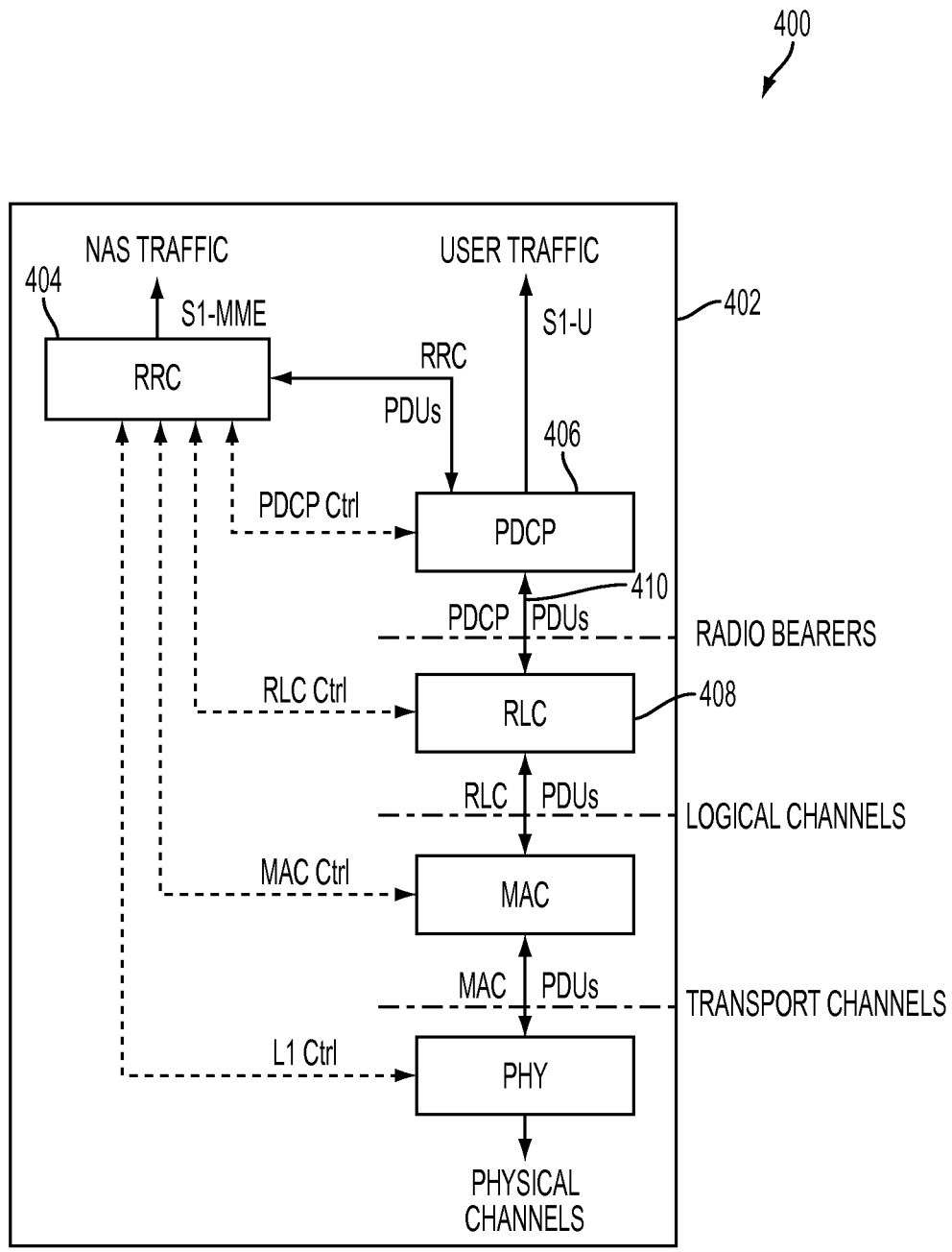
FIG. 4 depicts a prior art 3GPP LTE software layering architecture.
Figure 5:
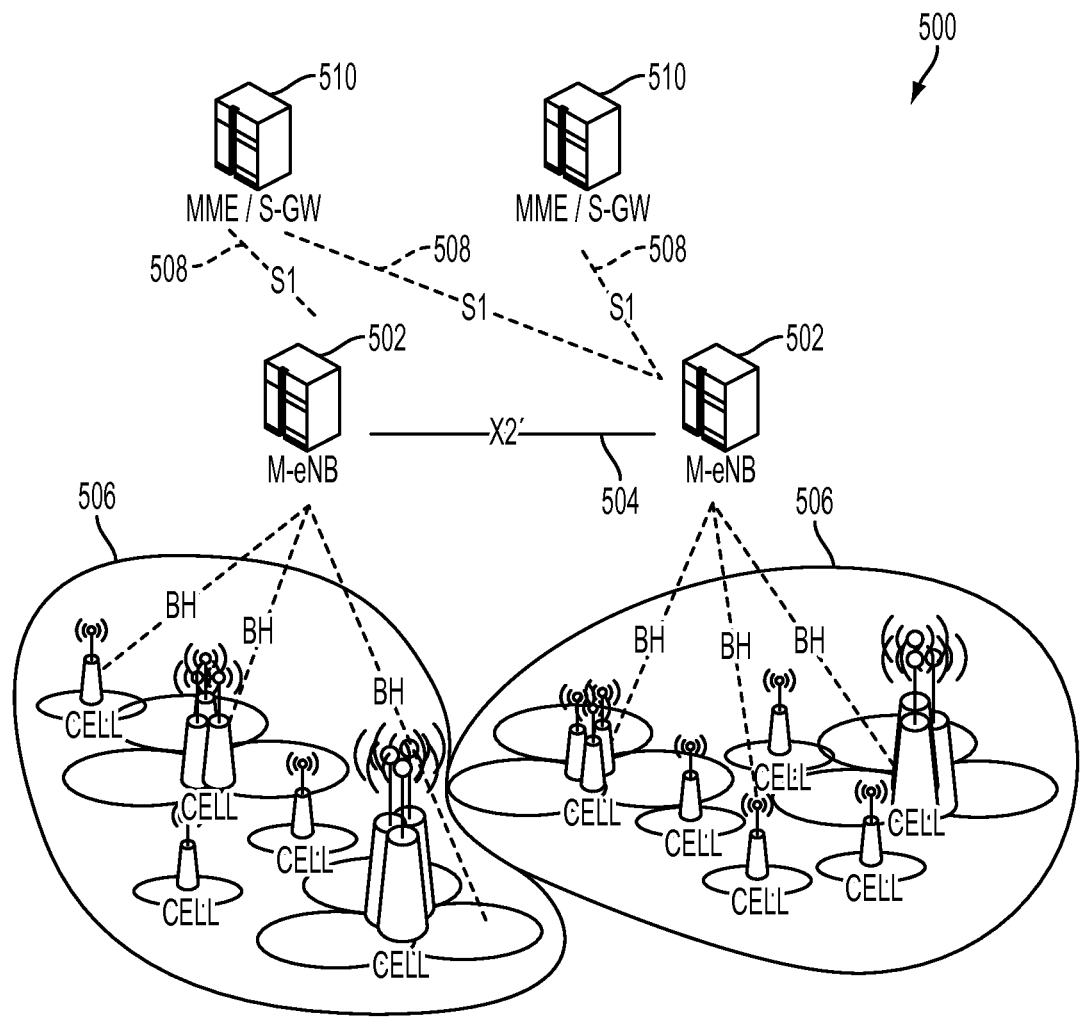
FIG. 5 depicts an exemplary M-eNB providing the transport and control functions between a MME/S-GW and a large group of cells.

The exemplary embodiments described herein have a common set of characteristics that can be associated with the exemplary embodiments. Looking now to FIG. 5 and one exemplary embodiment, the PDCP and the RRC functions can be decoupled from the eNB entity. In one aspect of the network 500 exemplary embodiment, the computer processing associated with the RRC and the PDCP functions is depopulated from the eNB. It should be noted in the exemplary embodiment that the depopulated PDCP and RRC functions (L3) from a plurality of eNBs are also known as the T&C pool. Continuing with the exemplary embodiment, the eNBs become simpler to manage because they are focused on only the L1 and L2 functions. A new entity, a managed eNB (M-eNB) 502, handles the L3 T&C pool functions. Next in the exemplary embodiment, the L3 T&C pool functions can be implemented using general purpose hardware platforms or embedded into existing network elements. Continuing with the exemplary embodiment, the L3 T&C pool functions are centralized so they provide L3 services to a much larger number of eNBs and correspondingly to a much larger number of cells 506.

Continuing with the exemplary embodiment, the M-eNB 502 can correlate the physical, media access and radio link measurements from a large number of eNBs (cells), carriers and RATs allowing the M-eNB 502 to make first stage radio resource allocations (e.g. frequency selective scheduling) across a large number of eNBs (cells). It should be noted in the exemplary embodiment that the resource allocations are relatively long-lived, on the order of hundreds of milliseconds to seconds. It should further be noted in the exemplary embodiment that the transport function can be physically separated from the control function, exploiting the fact that transport traffic data and control traffic data volumes and their associated processor and memory requirements are not symmetric.

Continuing with the exemplary embodiment, the T&C pool function manages the correct transmission end user state and end user traffic during mobility events, therefore eliminating the requirement of eNB to eNB transfer of state and traffic data. Next in the exemplary embodiment, a modified interface X2' 504 is deployed between M-eNBs 502 with the number of inter-T&C connections being relatively few. Continuing with the exemplary embodiment, protocols are defined for transmitting control signaling and data packets between the eNBs and the T&C pool functions through a shared IP based network. It should be noted in the exemplary embodiment that existing 3GPP specifications do not provide a signaling protocol for transmitting T&C packets through a shared network.

Next in the exemplary embodiment, it should be noted that the LTE T&C functions are dedicated to IP packet processing at layer 3 (network layer) and above for the data plane. For example, data plane security should be performed at a network location that is secure and protected from unauthorized access. Continuing with the exemplary embodiment, LTE data plane functions also include but are not limited to generation and management of encryption and integrity keying material for end user sessions and accordingly, by performing these functions centrally, the data plane packets are secure during transmission to the eNBs. This feature of the exemplary embodiment provides a greater level of security than the existing LTE network, which distributes this functionality between the MME 510 and the eNB with integrity keying material sent from the operator's core network to the eNBs, leaving user's data packets without 3GPP security applied until they reach the eNB.

According to one exemplary embodiment, IP packet compression using RoHC offers better performance when compression (signal overhead savings) is accomplished as close to the operator's network as possible and where mobility events do not require the complex RoHC state transfer from one eNB to another. It should be noted in the exemplary embodiment that RoHC state context is transparent to eNB mobility events.

According to an exemplary embodiment, the T&C architecture comprises a T&C entity such as an M-eNB 502 encompassing PDCP and RRC functions for one or more eNBs. It should be noted in this exemplary embodiment that the northbound S1 interfaces 508 from the M-eNB 502 to the MME/S-GW 510 remain unchanged.

Figure 6:
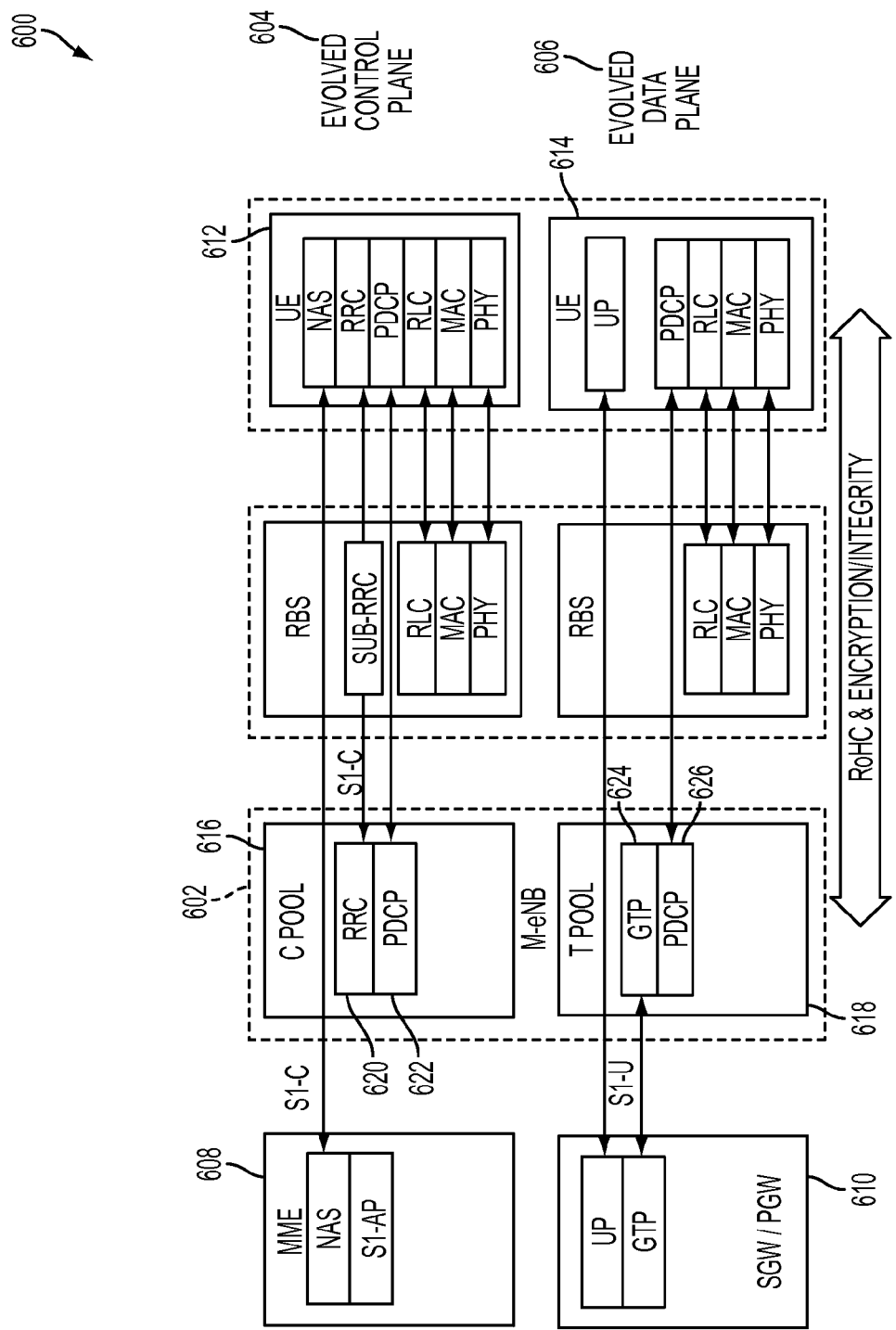
FIG. 6 depicts an exemplary embodiment of a 3GPP E-UTRAN software layering separation with a dedicated T&C pool entity.

Looking now to FIG. 6, an exemplary embodiment of the 3GPP E-UTRAN software layering separation 600 for a dedicated T&C pool entity, such as an M-eNB 602 is depicted. It should be noted in the exemplary embodiment that the software layering separation 600 is divided between an evolved control plane 604 and an evolved data plane 606 from the MME 608 to the UE 612 in the evolved control plane 604 and from the S-GW 610 to the UE 614 in the evolved data plane 606. Next in the exemplary embodiment, the M-eNB 602 comprises a C pool 616 in the evolved control plane 604 and a T pool 618 in the evolved data plane 606. Next in the exemplary embodiment, the C pool 616 comprises an RRC component 620 and a PDCP component 622. Continuing with the exemplary embodiment, the T pool 618 comprises a GTP 624 and a PDCP 626. It should be noted in the exemplary embodiment that the RoHC and the encryption/integrity flows from the M-eNB 602 to the UE 612, 614.

Continuing with the exemplary embodiment, a single eNB can be dedicated as the T&C provider for a group of eNBs. In this exemplary embodiment architecture, all but one of the eNBs in the group can use the resources of the T&C eNB. This exemplary embodiment is especially useful when a network is comprised of existing eNBs and is being augmented with heterogeneous style small cells. In this exemplary embodiment, the T&C eNB acts as a controller and maintains the T&C context for a large number of smaller and simpler eNB elements, providing for the distribution of the lower layer radio functions while acting as a single point for upper layer control and resource management.

Figure 7:
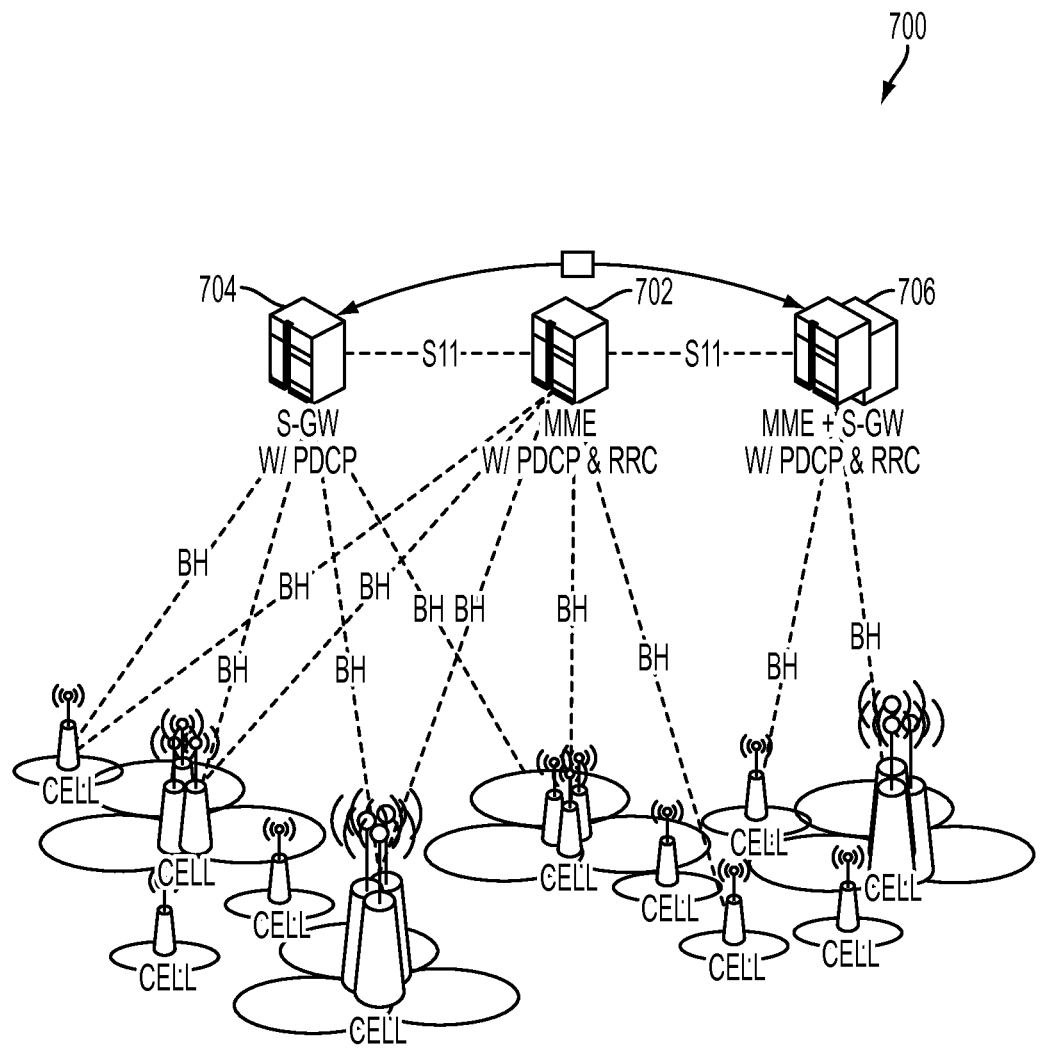
FIG. 7 depicts an exemplary embodiment of a MME server and a S-GW server integrated with PDCP and RRC functions.

Looking now to FIG. 7, an exemplary embodiment of extending the existing MME 702, S-GW 704 and MME/S-GW 706 nodes responsibilities by integrating the T&C functions (PDCP/RRC) for one or more cells is depicted. It should be noted in the exemplary embodiment that the S1 interface associated with these nodes becomes an internal logical interface within the MME 702, S-GW 704 and MME/S-GW 706 nodes.

Figure 8:
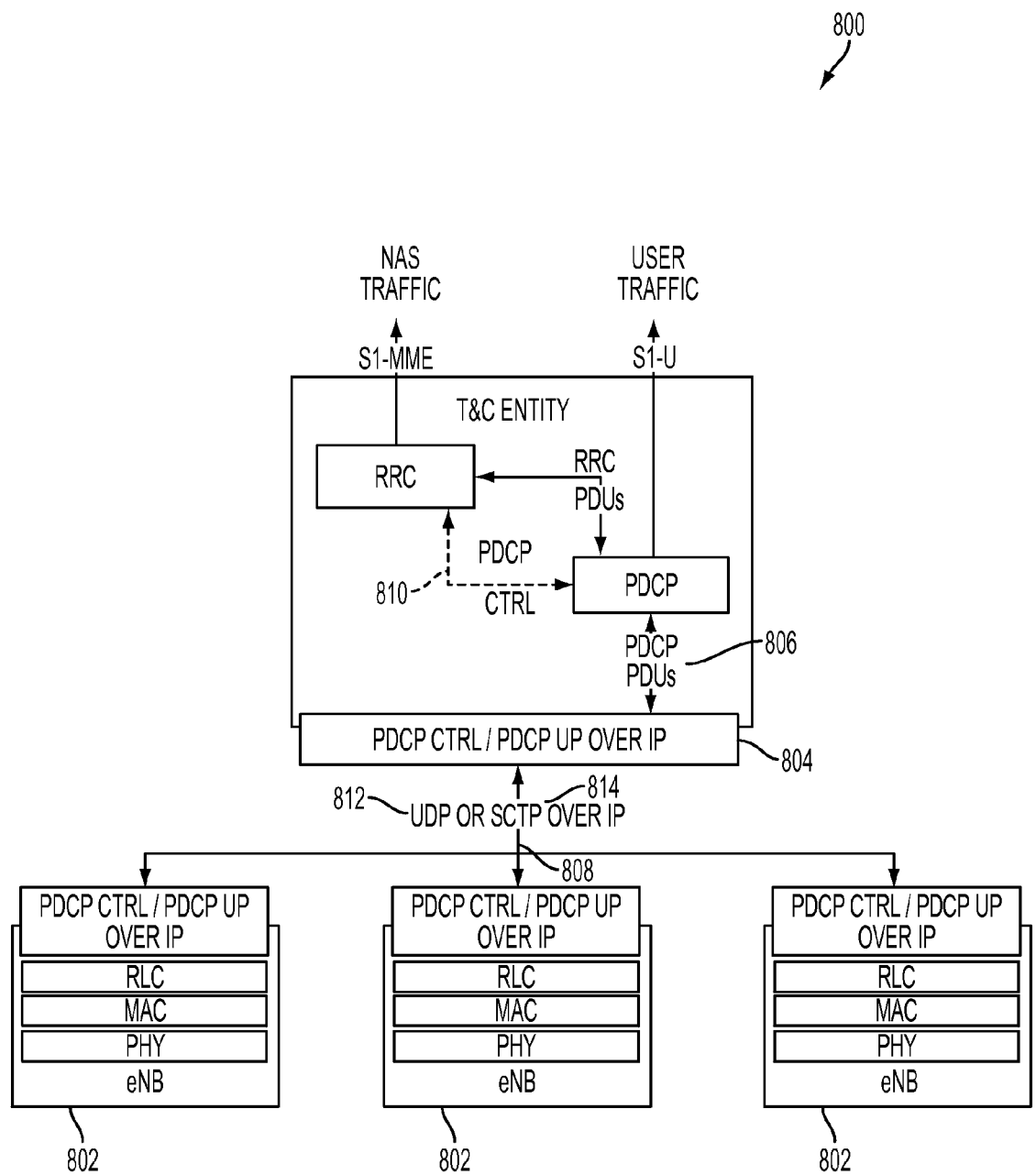
FIG. 8 depicts an exemplary embodiment of an inter-nodal PDCP-RLC interface between a T&C pool entity and an eNB.

Looking now to FIG. 8 for another aspect of the exemplary embodiment, a signaling protocol 800 for transmitting the T&C packets over a shared IP network. The exemplary embodiment comprises new interfaces between an eRBS 802 (i.e., eNB) and the T&C pool functions 804 and specifies protocols for PDCP-PDU 806 message exchange over an IP network 808. Further in the exemplary embodiment, an interface and protocol 810 is defined for exchanging PDCP control data between the user plane transport and the control plane functions for applications when these functions are not co-located. It should be noted in the exemplary embodiment that the IP network 808 can use UDP 812 or SCTP 814 over the IP network 808.

Figure 9:
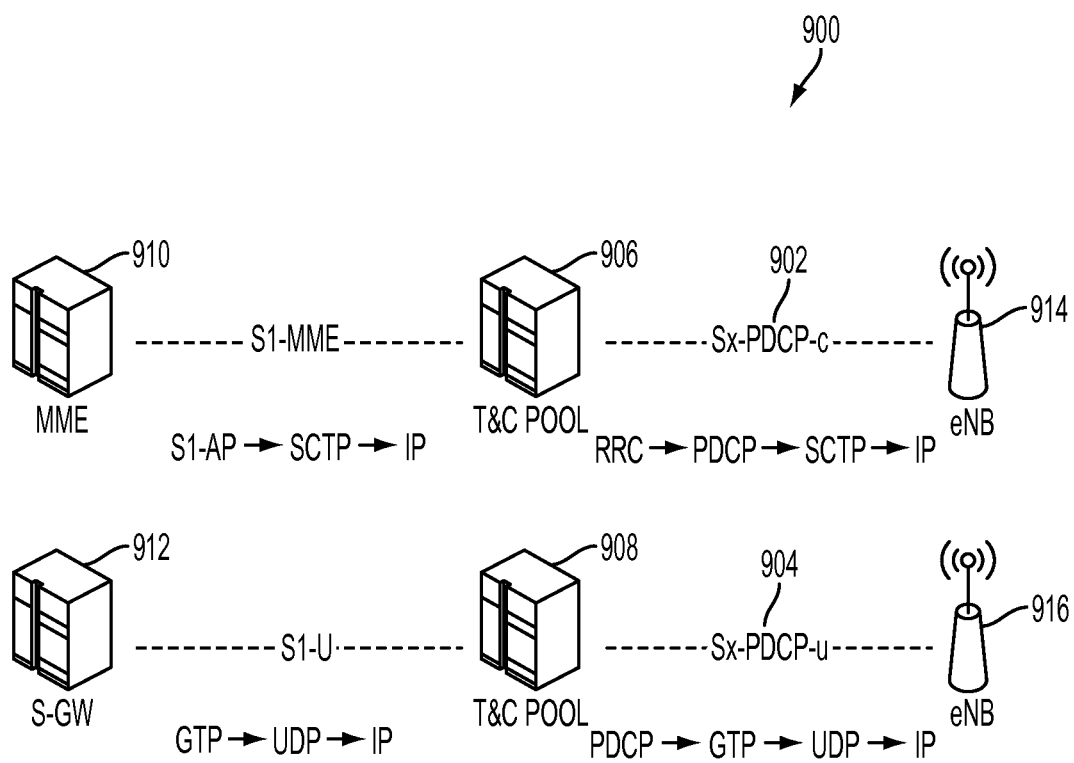
FIG. 9 depicts an exemplary embodiment of T&C pool interfaces and protocols for PDCP-PDU messaging for a control plane and a user plane.

Looking now to FIG. 9 for another aspect of the exemplary embodiment, new interfaces and protocols 900 are depicted. Continuing with the exemplary embodiment, the 3GPP TS 36.412 "S1 Signaling Transport" and TS 36.413 "S1 Application Protocol (S1AP)" for the control plane, incorporated herein by reference and 3GPP TS 36.414 "S1 Data Transport" and TS 29.281 "General Packet Radio System Tunneling Protocol User Plane (GTPv1-U)" for the user plane, incorporated herein by reference, are extended to support transporting PDCP-PDUs through the E-UTRAN network, i.e., exchanging PDCP-PDU messages between network nodes across a shared communications network such as but not limited to an IP network. It should be noted in the exemplary embodiment that these extended interfaces and protocols are labeled as Sx-PDCP-c 902 for the control plane and Sx-PDCP-u 904 for the user plane. It should further be noted in the exemplary embodiment that the Sx-PDCP-c 902 interface and protocol provides communication capabilities between the T&C pool functions 906 and the eNB 914 in the control plane and the Sx-PDCP-u 904 interface and protocol provides communication capabilities between the T&C pool functions 908 and the eNB 916 in the user plane.

Continuing with the exemplary embodiment, although the S1-MME interface and protocol between the T&C pool functions 906 and the MME 910 and the S1-U interface and protocol between the T&C pool functions 908 and the S-GW 912 remains unchanged, the T&C pool functions 906, 908 can be integrated with existing network elements such as but not limited to a UTRAN RNC or a UTRAN MME and S-GW (e.g. the control functions RRC and PDCP for RRC can be integrated with the RNC and the user plane traffic PDCP functions can be integrated with the S-GW). It should be noted in the exemplary embodiment that the extended interfaces 902, 904 can exist as a single physical interface using either the same or different protocols. It should further be noted that the T&C pool 906, 908 is a functional entity rather than a physical node and can be located in a separate, stand-alone node or integrated and co-located within existing nodes such as but not limited to the MME 910 and the S-GW 912.

Figure 10:
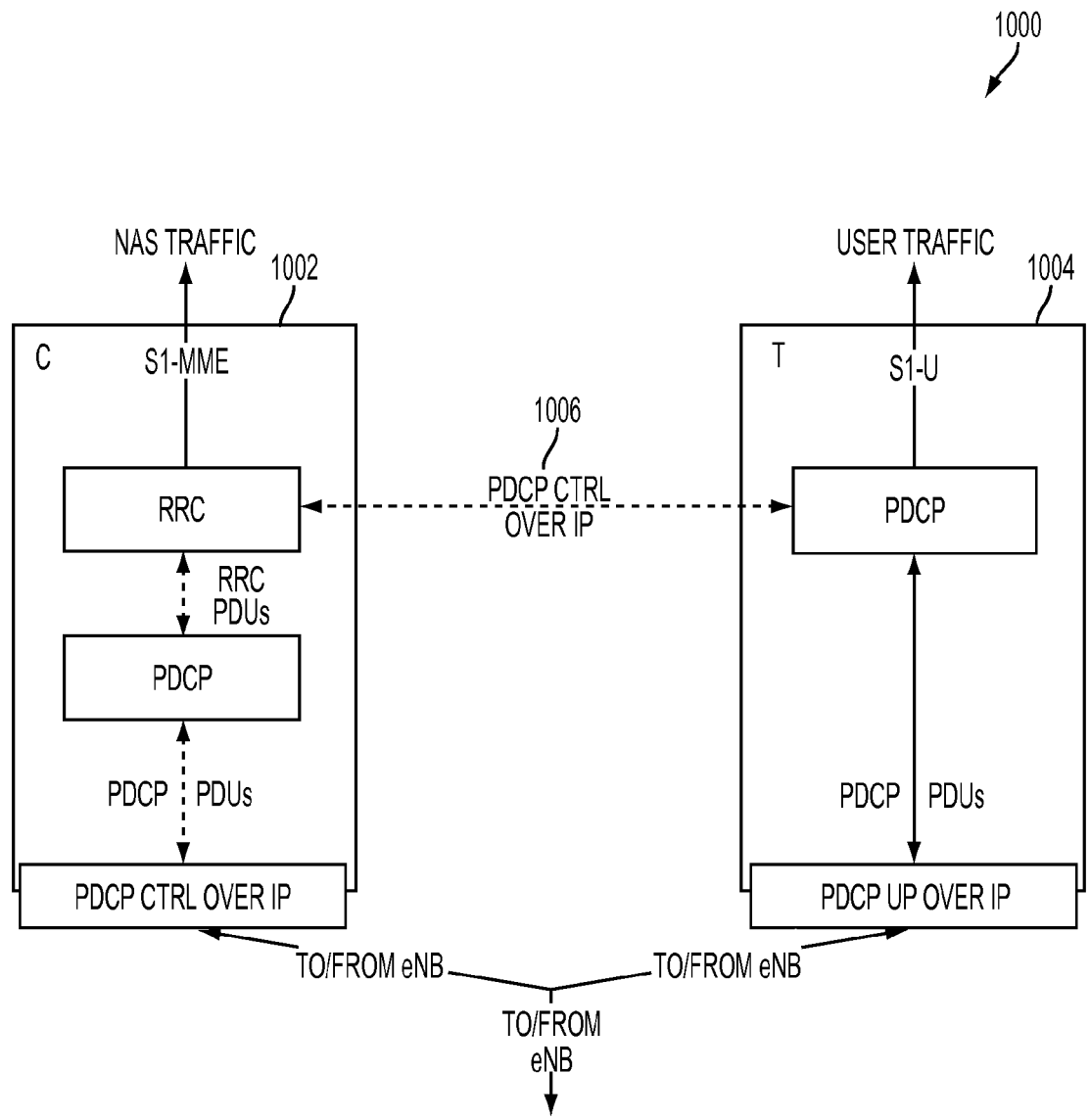
FIG. 10 depicts an exemplary embodiment of separate Transport and Control entities with a PDCP control interface.

Looking now to FIG. 10, an exemplary embodiment with the control plane and user plane functions instantiated in separate nodes 1000 is depicted. Continuing with the exemplary embodiment, an interface is defined to exchange PDCP control data between the control node 1002 and the transport node 1004. It should be noted in the exemplary embodiment that this node is labeled the PDCP Ctrl 1006. It should further be noted in the exemplary embodiment that this interface can use, but is not limited to, the GTPv1-P protocol or the S1AP-P protocol for exchanging PDCP control data between the nodes 1002, 1004. It should also be noted in the exemplary embodiment that when the transport and/or control entity is integrated into the S-GW or the MME node, the PDCP control data can be included as new information elements within the existing S11 interface, i.e., 3GPP TS 23.401, incorporated herein by reference, and TS 36.300, incorporated herein by reference.

Continuing with the exemplary embodiment, the PDCP-PDUs can be encapsulated and transported using the existing GTPv1-U protocol and/or S1AP protocol with modifications. It should be noted in the exemplary embodiment that the control and user plane traffic messages sent over the interfaces can be sent using the modified 3GPP TS 36.414 S1-U interface protocol described herein. In an alternative exemplary embodiment, the control and user plane traffic messages sent over the Sx-PDCP-c and Sx-PDCP-u interfaces can be sent using the modified 3GPP TS 36.412 signaling transport and the TS 36.413 S1AP interface protocol as described herein. In another aspect of the exemplary embodiment, the control messages sent over the Sx-PDCP-c interface can be sent over the modified 3GPP TS 36.412 S1AP interface protocol as described herein while the user plane messages sent over the Sx-PDCP-u interface can be sent over the modified 3GPP TS 36.414 S1-U interface protocol described herein. It should be noted in the exemplary embodiment that the message sequences between the T&C pool and the RBS (eNB) match those of the S1AP and the GTPv1-U specifications.

In another aspect of the exemplary embodiment, the T&C pool entity can efficiently discriminate the traffic from existing traditional eNB cells using a standard S1-U and S1-C interface from M-eNB cells described herein, this ability provides for a simpler network deployment by allowing the multiplexing of traffic from all existing eNB cells and M-eNB cells to interface with a T&C pool entity. Further in the exemplary embodiment, as eNB cells are upgraded to use the T&C pool for their PDCP and RRC functions, the T&C pool does not require any reconfiguration for its' interfaces to the subject eNB.

Figure 11:
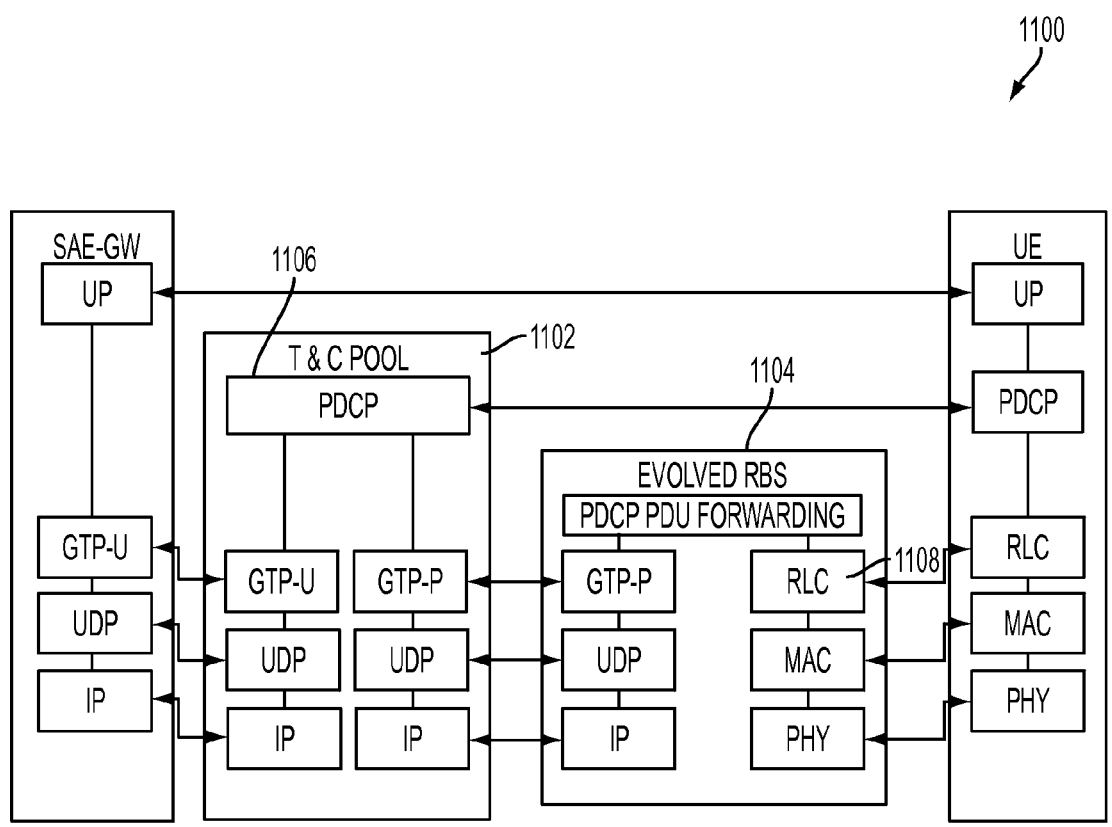
FIG. 11 depicts an exemplary embodiment of a GTPv1-P protocol entity for exchanging PDCP-PDUs.

Looking now to FIG. 11, an exemplary embodiment GTPv1-P protocol entity 1100 for exchanging PDCP-PDUs is depicted. The exemplary embodiment protocol entity 1100, based on the GTPv1-U protocol, is used to define GTPv1-P tunnels for carrying encapsulated PDCP-PDU messages between a given pair of GTPv1-P entities. Continuing with the exemplary embodiment, the GTPv1-P protocol entity 1100 provides packet transmission and reception services to PDCP 1106 and RLC 1108 entities in the T&C pool 1102 and the M-eNB 1104. Next in the exemplary embodiment, the GTPv1-P protocol entity receives traffic from a number of GTPv1-P tunnel endpoints and transmits traffic to a number of GTPv1-P tunnel endpoints. It should be noted in the exemplary embodiment that providing for the coexistence of existing GTPv1-U interfaces and the GTPv1-P interface described herein, the message header comprises an indication of the message contents so the existing GTPv1-U messages can be distinguished from the GTPv1-P messages.

TABLE 1

Example GTPv1-P Header

| Octets | Bits | | | | | | | |
|---|---|---|---|---|---|---|---|---|
| | 8 | 7 | 6 | 5 | 4 | 3 | 2 | 1 |
| 1 | Version | | | 0 | 1 | 0 | 0 | 0 |
| 2 | Message Type | | | | | | | |
| 3 | Length (1st Octet) | | | | | | | |
| 4 | Length (2nd Octet) | | | | | | | |
| 5 | Tunnel Endpoint Identifier (1st Octet) | | | | | | | |
| 6 | Tunnel Endpoint Identifier (2nd Octet) | | | | | | | |
| 7 | Tunnel Endpoint Identifier (3rd Octet) | | | | | | | |
| 8 | Tunnel Endpoint Identifier (4th Octet) | | | | | | | |

Continuing with the exemplary embodiment and as illustrated in Table 1, GTPv1-P packets can be distinguished from GTPv1-U packets by setting the fourth bit of the first octet to one. In another aspect of the exemplary embodiment, the message type field shown in the second octet can be used to indicate the type of PDCP-PDU contained in the GTPv1-P packet, e.g., SRB PDCP data PDUs, seven or twelve bit sequence number DRB PDCP data PDUs, RoHC feedback packet PDCP control PDUs or PDCP status report PDCP control PDUs. Continuing with the exemplary embodiment, the TEID present in the GTPv1-P header unambiguously identifies which PDCP and RLC instance maintains a given TEID, i.e., the TEID uniquely identifies a radio bearer.

In another exemplary embodiment, each PDCP-PDU is encapsulated within a GTPv1-P header at the sending node. In one aspect of the exemplary embodiment the fourth bit in the first octet of the GTPv1-P header is set to one to indicate that this GTPv1-P packet contains a PDCP-PDU payload. It should be noted in the exemplary embodiment that this bit position is currently reserved and unused and will be inspected by only the M-eNB and the T&C pool entities. Continuing with the exemplary embodiment, the GTPv1-P packet is then further encapsulated in UDP and IP, according to the GTPv1-U specifications, before transmission toward the packet destination.

Next in the exemplary embodiment, the destination UDP port can be the same as the GTPv1-U specifications (3GPP TS 29.281, included herein by reference), i.e., UDP port 2152 or a different port can be used, e.g., a port chosen from within the IRNA Registered Ports Range of 1024 to 49151. It should be noted in the exemplary embodiment, that choosing a different destination port than the port used by the GTPv1-U protocol, the receiving node, e.g., the T&C pool entity or the S-GW, can distinguish messages at the UDP network layer allowing the flexibility to route the message internally within the node for more efficient processing. It should further be noted in the exemplary embodiment that the IP and UDP headers are removed at the receiving end of the communication and if the GTPv1-P packet was received at a port mutually agreed upon for exchanging PDCP-PDUs, the receiving entity can assume that the received packet contains a PDCP-PDU.

Continuing with the exemplary embodiment, the GTPv1-P header can also indicate that the payload of the packet contains a PDCP-PDU. Next in the exemplary embodiment, the payload contents are passed to the PDCP functional entity responsible for processing PDCP-PDUs and based upon the Message Type and the TEID fields in the packet header, the PDCP-PDU can be associated with the unique PDCP or RLC instance for that PDCP-PDU.

Figure 12:
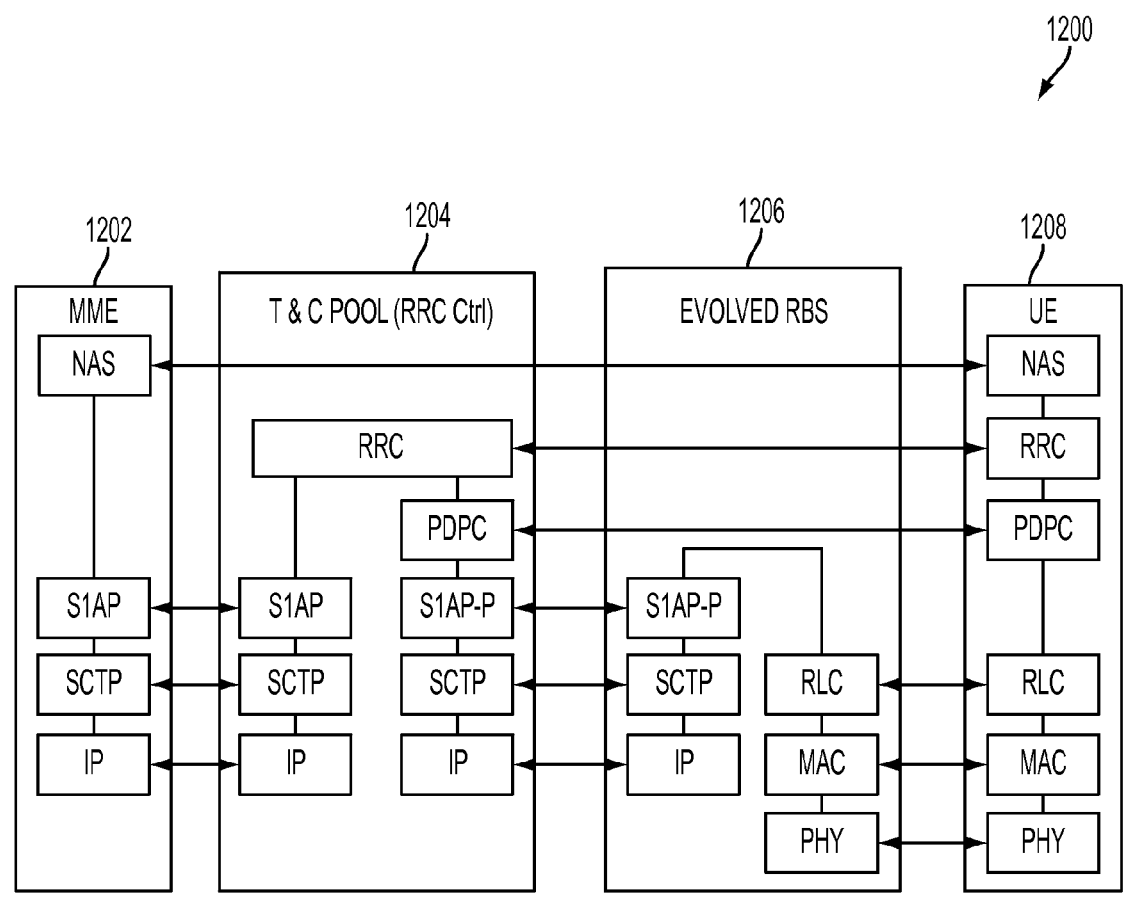
FIG. 12 depicts an exemplary embodiment of a S1AP-P protocol entity for exchanging PDCP-PDUs.
Figure 13A:
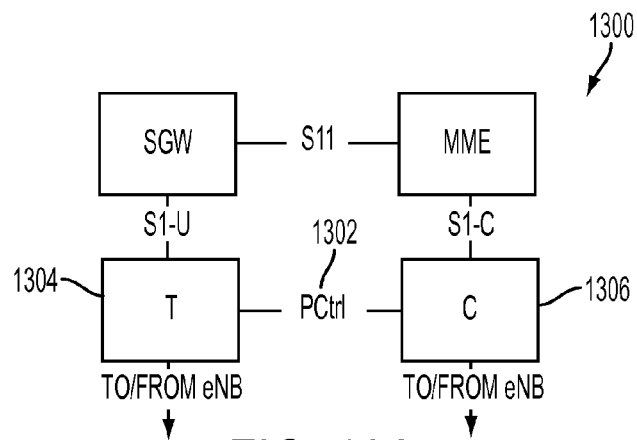
FIG. 13 depicts an exemplary embodiment in A of standalone separate Transport and Control entities using a dedicated interface for PDCP control data exchange, in B of Control functions integrated with MME and standalone Transport entity, in C of Transport functions integrated with S-GW and standalone Control entity, and in D of Control functions integrated with MME and Transport functions integrated with S-GW.
Figure 13B:
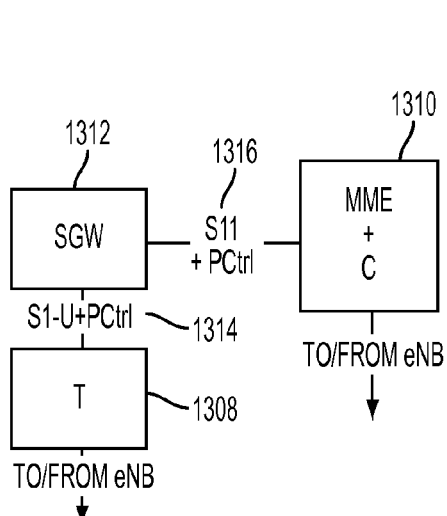
Figure 13C:
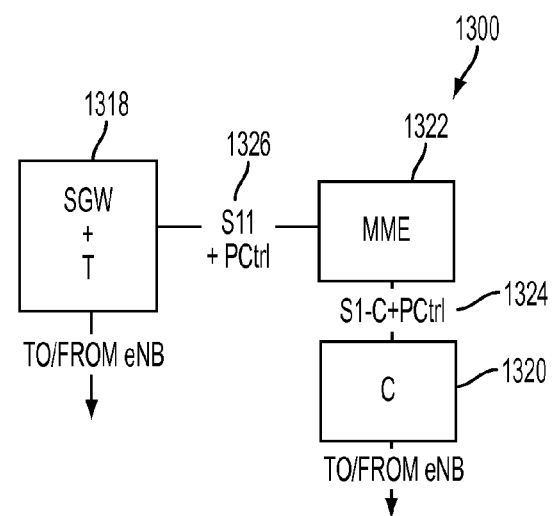
Figure 13D:
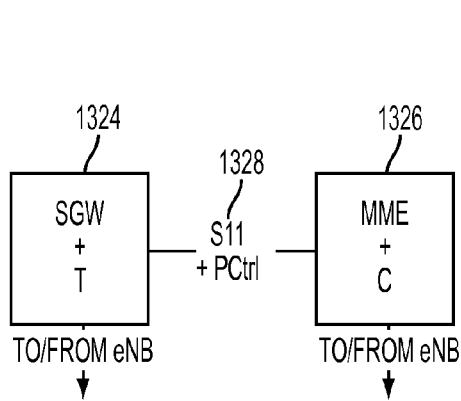

Looking now to FIG. 12, a diagram of PDCP-PDU messaging based on S1AP/S1-MME protocol 1200 is depicted. The exemplary embodiment comprises a MME node 1202, a T&C Pool node 1204, an M-eNB node 1206 and a UE node 1208. It should be noted in the exemplary embodiment that the M-eNB node is also known as an evolved RBS node or an evolved eNB node. Continuing with the exemplary embodiment, in order for the T&C pool and evolved eNB to exchange PDCP-PDUs with the existing S1AP protocol and S1-MME interface, a number of extensions are required to the S1AP protocol and optionally to the S1-MME interface. It should be noted in the exemplary embodiment that the extended protocol is named S1AP-P herein.

In another aspect of the exemplary embodiment, the S1AP protocol has signaling messages comprising fields of Message Type, MME UE S1AP ID and eNB UE S1AP ID that will be configured and interpreted in an extended fashion when the payload contains PDCP-PDU data in order to exchange PDCP-PDUs using S1AP/S1-MME. Next in the exemplary embodiment, the SCTP port can be the same as the S1AP specifications (3GPP TS 36.412, included herein by reference), i.e., UDP port 36412 or a different port can be used, e.g., a port chosen from within the IRNA Registered Ports Range of 1024 to 49151. It should be noted in the exemplary embodiment, that choosing a different destination port than the port used by the S1AP protocol, the receiving node, e.g., the T&C pool entity or the evolved eNB, can distinguish messages at the UDP network layer allowing the flexibility to route the message internally within the node for more efficient processing.

Continuing with the exemplary embodiment, the SCTP payload protocol identifier can be different and the PDCP-PDU shall not be ASN.1 encoded. It should be noted in the exemplary embodiment that the PDCP-PDU shall be contained within the modified S1AP packets as unmodified byte aligned data. It should further be noted in the exemplary embodiment that the modifications to the existing S1AP header fields allow for the S1AP and S1AP-P traffic to be terminated and processed separately by the same entity, e.g., the T&C pool entity.

Looking now to FIG. 13, four exemplary PDCP control interfaces where the transport and control entities are separated by a shared network are depicted. It should be noted in the exemplary embodiment that PDCP control data can be exchanged via either one or a combination of the GTPv1-P, S1AP-P and the s11 interface protocols. Continuing with the exemplary embodiment and looking to 13A, the PDCP control data is exchanged between the T 1304 and C 1306 nodes using either GTPv1-P or S1AP-P messaging 1302. Next, looking to 13B of the exemplary embodiment, the PDCP control data is exchanged between the T node 1308 and the MME+C node 1310 using GTPv1-P messaging 1314 between the T node 1308 and the S-GW node 1312 and the S11 interface messaging 1316 between the S-GW node 1312 and the MME+C node 1310. Continuing with 13C of the exemplary embodiment, the PDCP control data is exchanged between the SGW+T 1318 and the C node 1320 using S1AP-P protocol messaging 1324 between the C node 1320 and the MME node 1322 and S11 interface messaging 1326 between the MME node 1322 and the S-GW+T node 1318. Next, looking to 13D of the exemplary embodiment, the PDCP control data is exchanged between the S-GW+T node 1324 and the MME+C 1326 node using the S11 protocol messaging 1328 between the S-GW+T node 1324 and the MME+C node 1326. It should be noted in the exemplary embodiment that for each of the aforementioned configurations the transport and control functions can similarly be integrated with a UTRAN RNC node. Continuing with the exemplary embodiment, the RNC can integrate the control functions for the LTE network while the transport is optimally routed directly between the S-GW containing the transport functions and the eNB. In another aspect of the exemplary embodiment, the transport functions can be integrated into an eNB.

Embodiments descried herein can provide various advantages and benefits. For example, T&C functions can scale to support very large numbers of eNB cells, potentially tens of thousands; smaller, simpler and cheaper eNBs because fewer functions residing at the eNB; end user data plane security is applied at a centralized entity without the distribution of sensitive keying material to remote, potentially less secure eNB sites, i.e., the data plane packets are secured from the T&C function to the UE; IP layer 3 and layer 4 services, such as but not limited to RoHC can be applied nearer to the operator's core network allowing the IP network to the eNB to benefit from these services, allowing more of the network to benefit from the data compression that RoHC provides, e.g., reducing traffic in the operator's network; the T&C entity can correlate PHY, MAC and RLC measurements from a large number of eNBs allowing it to make first stage radio resource allocations, e.g., frequency selective scheduling, wherein these resource allocations are relatively long lived (100 s of milliseconds to seconds) allowing the radio resources to be utilized in a more efficient manner which will increase the capacity of the eNB cells managed by the T&C pool; this architecture allows the development of separate hardware platforms dedicated to either forwarding user traffic or controlling user sessions and cell resources wherein the asymmetry of the user traffic and control traffic allows the hardware platforms to be cost optimized for a specific task. It should further be noted that the protocol allows the T&C pool entity to be integrated into the MME and the S-GW nodes or to be located in separate nodes.

Figure 14:
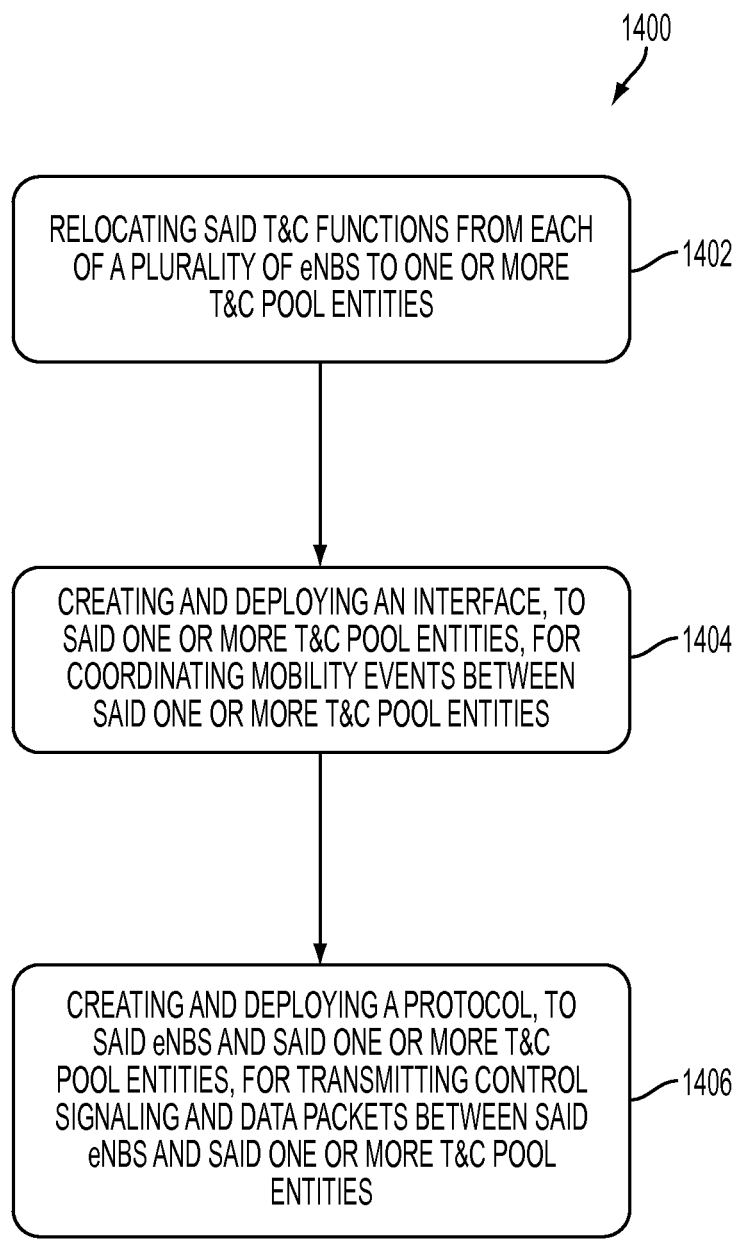
FIG. 14 depicts an exemplary method embodiment for centralizing transport and control functions.

Looking now to FIG. 14, an exemplary method embodiment 1400 for centralizing transport and control functions for efficient management of a plurality of eNBs and their associated cells is depicted. First at step 1402 of the exemplary method embodiment 1400, the transport and control functions contained in the eNB are decoupled from each of the plurality of eNBs and relocated to the T&C pool entities. It should be noted in the exemplary method embodiment 1400 that a T&C pool entity can be but is not limited to an existing network node or a general purpose hardware node.

Next, at step 1404 of the exemplary method embodiment, an interface is created and deployed to the T&C pool entities for communication between the T&C pool entities and coordinating mobility events between the T&C pool entities. It should be noted in the exemplary method embodiment that the created protocol can be enhancements to an existing protocol that allow a node to simultaneously process packets from existing eNBs and from the enhanced eNBs described herein.

Next, at step 1406 of the exemplary method embodiment, a protocol is created and deployed to the eNBs and to the T&C pool entities for transmitting control signaling and data packets between said eNBs and said one or more T&C pool entities over a shared network. It should be noted in the exemplary method embodiment that the created protocol can be an enhancement to an existing protocol. It should further be noted in the exemplary embodiment that the shared network can be an IP network.

Figure 15:
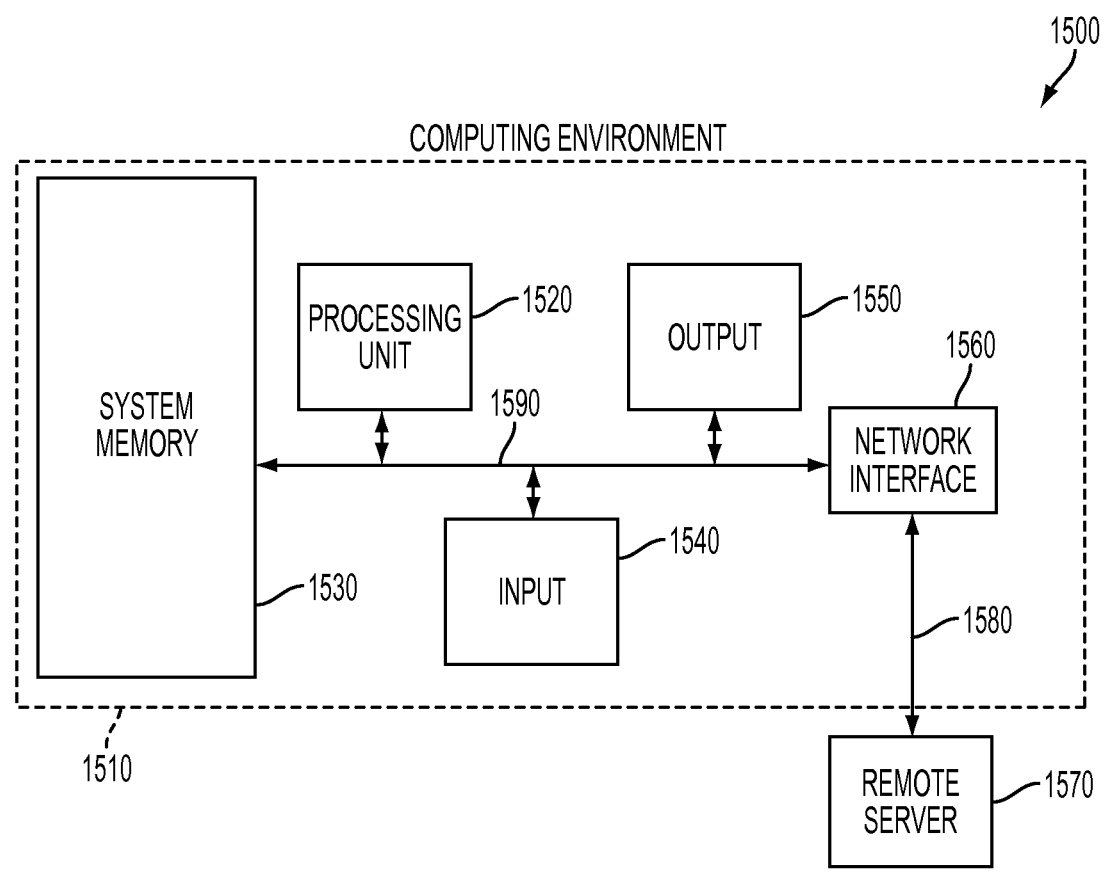
FIG. 15 depicts an exemplary computing environment for implementing methods for centralizing transport and control functions.

Looking now to FIG. 15, an example of a suitable computing system environment 1500 in which the claimed subject matter can be implemented, although as made clear above, the computing system environment 1500 is only one example of a suitable computing environment for an exemplary embodiment and is not intended to suggest any limitation as to the scope of use or functionality of the claimed subject matter. Further, the computing environment 1500 is not intended to suggest any dependency or requirement relating to the claimed subject matter and any one or combination of components illustrated in the example computing environment 1500.

Continuing with FIG. 15, an example of a device for implementing the previously described innovation includes a general purpose computing device in the form of a computer 1510. Components of computer 1510 can include, but are not limited to, a processing unit 1520, a system memory 1530, and a system bus 1590 that couples various system components including the system memory to the processing unit 1520. The system bus 1590 can be any of several types of bus structures including a memory bus or memory controller, a peripheral bus, and a local bus using any of a variety of bus architectures.

Computer 1510 can include a variety of computer readable media. Computer readable media can be any available media that can be accessed by computer 1510. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1510. Communication media can embody computer readable instructions, data structures, program modules or other data in a modulated data signal such as a carrier wave or other transport mechanism and can include any suitable information delivery media.

The system memory 1530 can include computer storage media in the form of volatile and/or nonvolatile memory such as read only memory (ROM) and/or random access memory (RAM). A basic input/output system (BIOS), containing the basic routines that help to transfer information between elements within computer 1510, such as during start-up, can be stored in memory 1530. Memory 1530 can also contain data and/or program modules that are immediately accessible to and/or presently being operated on by processing unit 1520. By way of non-limiting example, memory 1530 can also include an operating system, application programs, other program modules, and program data.

The computer 1510 can also include other removable/non-removable and volatile/nonvolatile computer storage media. For example, computer 1510 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 1590 through a non-removable memory interface such as an interface, and a magnetic disk drive or optical disk drive can be connected to the system bus 1590 by a removable memory interface, such as an interface.

A user can enter commands and information into the computer 1510 through input devices such as a keyboard or a pointing device such as a mouse, trackball, touch pad, and/or other pointing device. Other input devices can include a microphone, joystick, game pad, satellite dish, scanner, or similar devices. These and/or other input devices can be connected to the processing unit 1520 through user input 1540 and associated interface(s) that are coupled to the system bus 1590, but can be connected by other interface and bus structures, such as a parallel port, game port or a universal serial bus (USB).

A graphics subsystem can also be connected to the system bus 1590. In addition, a monitor or other type of display device can be connected to the system bus 1590 through an interface, such as output interface 1550, which can in turn communicate with video memory. In addition to a monitor, computers can also include other peripheral output devices, such as speakers and/or printing devices, which can also be connected through output interface 1550.

The processing unit 1520 can comprise a plurality of processing cores providing greater computational power and parallel computing capabilities. Further, the computing environment 1500 can contain a plurality of processing units providing greater computational power and parallel computing capabilities. It should be noted that the computing environment 1500 can also be a combination of multi-processor and multi-core processor capabilities.

The computer 1510 can operate in a networked or distributed environment using logical connections to one or more other remote computers, such as remote server 1570, which can in turn have media capabilities different from device 1510. The remote server 1570 can be a personal computer, a server, a router, a network PC, a peer device or other common network node, and/or any other remote media consumption or transmission device, and can include any or all of the elements described above relative to the computer 1510. The logical connections depicted in FIG. 15 include a network 1580, such as a local area network (LAN) or a wide area network (WAN), but can also include other networks/buses.

When used in a LAN networking environment, the computer 1510 is connected to the LAN 1580 through a network interface 1560 or adapter. When used in a WAN networking environment, the computer 1510 can include a communications component, such as a modem, or other means for establishing communications over a WAN, such as the Internet. A communications component, such as a modem, which can be internal or external, can be connected to the system bus 1590 through the user input interface at input 1540 and/or other appropriate mechanism.

In a networked environment, program modules depicted relative to the computer 1510, or portions thereof, can be stored in a remote memory storage device. It should be noted that the network connections shown and described are exemplary and other means of establishing a communications link between the computers can be used.

Additionally, it should be noted that as used in this application, terms such as "component," "display," "interface," and other similar terms are intended to refer to a computing device, either hardware, a combination of hardware and software, software, or software in execution as applied to a computing device implementing a virtual keyboard. For example, a component may be, but is not limited to being, a process running on a processor, a processor, an object, an executable, a thread of execution, a program and a computing device. As an example, both an application running on a computing device and the computing device can be components. One or more components can reside within a process and/or thread of execution and a component can be localized on one computing device and/or distributed between two or more computing devices, and/or communicatively connected modules. Further, it should be noted that as used in this application, terms such as "system user," "user," and similar terms are intended to refer to the person operating the computing device referenced above.

Further, the term to "infer" or "inference" refer generally to the process of reasoning about or inferring states of the system, environment, user, and/or intent from a set of observations captured from events and/or data. Captured events and data can include user data, device data, environment data, behavior data, application data, implicit and explicit data, etc. Inference can be employed to identify a specific context or action, or can generate a probability distribution over states, for example. The inference can be probabilistic in that the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The above-described exemplary embodiments are intended to be illustrative in all respects, rather than restrictive, of the present innovation. Thus the present innovation is capable of many variations in detailed implementation that can be derived from the description contained herein by a person skilled in the art. All such variations and modifications are considered to be within the scope and spirit of the present innovation as defined by the following claims. No element, act, or instruction used in the description of the present application should be construed as critical or essential to the invention unless explicitly described as such. Also, as used herein, the article "a" is intended to include one or more items.

The invention claimed is:

1. A server configured to function as a transport and control (T&C) pool entity for managing transport and control functions for a plurality of eNodeBs (eNBs) over a shared network, said server comprising:
 a processor configured to execute computer instructions and a memory configured to store said computer instructions, said computer instructions being separated into T-pool components and C-pool components:
 said C-pool components comprising:
  a first Packet Data Convergence Protocol (PDCP) component, the first PDCP component operating in an evolved control plane to communicate with a user equipment (UE); and
  a Radio Resource Controller (RRC) component, the RRC component operating in the evolved control plane to communicate with an eNB; and
 said T-pool components comprising:
  a second PDCP component, the second PDCP component operating in an evolved data plane to communicate with the UE; and
  a General Packet Radio System Tunneling Protocol (GTP) component, the GTP component operating in the evolved data plane to communicate with a serving gateway (SGW).

2. The server of claim 1, wherein said shared network is an IP network.

3. The server of claim 1, further comprising a mobility event component configured to manage mobility events, associated with said plurality of eNBs, between said server and other transport and control (T&C) pool entities.

4. The server of claim 1, wherein said server further comprises a modified X2 interface component for communication with other transport and control (T&C) pool entities.

5. The server of claim 1, wherein said server further comprises a data plane security component configured to manage security between said server and said plurality of eNBs.

6. The server of claim 5, wherein said data plane security component further comprises an encryption/decryption component configured to encrypt data before transmission toward said plurality of eNBs and to decrypt data received from said plurality of eNBs.

7. The server of claim 1, further comprising a compression component configured to reduce data volume before transmission of said transport packets.

8. The server of claim 7, wherein said compression component is configured to use robust header compression (RoHC).

9. The server of claim 1, wherein said signaling protocol component uses an enhanced general tunneling protocol.

10. The server of claim 9, wherein said enhanced general tunneling protocol is a GTPv1-U specification protocol with an unused header location configured to identify a packet as a GTPv1-P enhanced general tunneling protocol packet.

11. The server of claim 9, wherein said enhanced general tunneling protocol is a GTPv1-U specification protocol with a Message Type field configured to identify a packet as a GTPv1-P enhanced general tunneling protocol packet.

12. The server of claim 1, wherein said signaling protocol component uses an enhanced S1AP protocol wherein a non-standard and unique port number or a non-standard and unique Payload Protocol Identifier is used to identify a packet as an S1AP-P packet.

13. The server of claim 1, wherein said server is an enhanced Serving-Gateway (S-GW) node.

14. The server of claim 1, wherein said server is a Managed eNB server implemented in one of: a general purpose hardware platform and an existing network node in the shared network.

15. The server of claim 1, wherein said server is an enhanced Mobility Management Entity (MME).

16. The server of claim 15, wherein said server is an enhanced MME combined with a Serving-Gateway (S-GW) node.

* * * * *

UNITED STATES PATENT AND TRADEMARK OFFICE
CERTIFICATE OF CORRECTION

| | |
|---|---|
| PATENT NO. | : 9,131,526 B2 |
| APPLICATION NO. | : 13/484903 |
| DATED | : September 8, 2015 |
| INVENTOR(S) | : Comeau et al. |

Page 1 of 1

It is certified that error appears in the above-identified patent and that said Letters Patent is hereby corrected as shown below:

Title Page, Item (56), under "OTHER PUBLICATIONS", in Column 2, Line 4, delete "Opinino" and insert -- Opinion --, therefor.

In the Specification

In Column 1, Line 33, delete "RNCs 106." and insert -- RNCs 104. --, therefor.

In Column 1, Line 42, delete "RNC 106" and insert -- RNC 104 --, therefor.

In Column 3, Line 18, delete "IRNA" and insert -- IANA --, therefor.

In Column 3, Line 21, delete "Access Layer" and insert -- Access Control --, therefor.

In Column 9, Line 18, delete "IRNA" and insert -- IANA --, therefor.

In Column 9, Line 60, delete "IRNA" and insert -- IANA --, therefor.

In Column 10, Line 45, delete "descried" and insert -- described --, therefor.

Signed and Sealed this
Fifth Day of July, 2016

Michelle K. Lee
*Director of the United States Patent and Trademark Office*